June 6, 1950 W. W. JURY 2,510,181
CLAMP AND BRACKET ASSEMBLY
Filed July 9, 1946
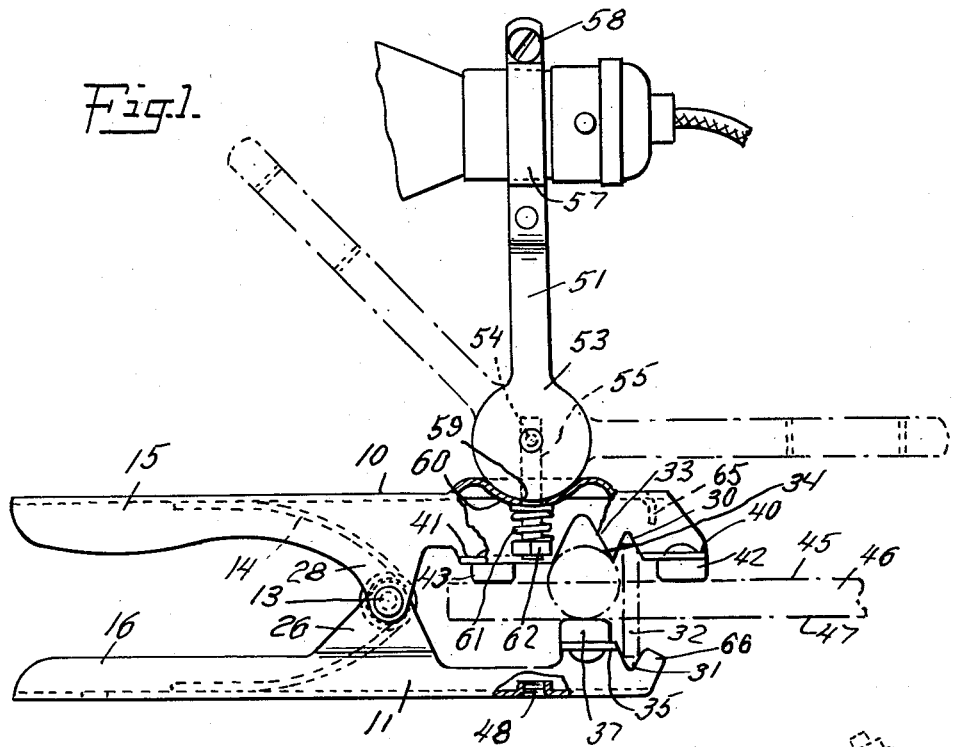
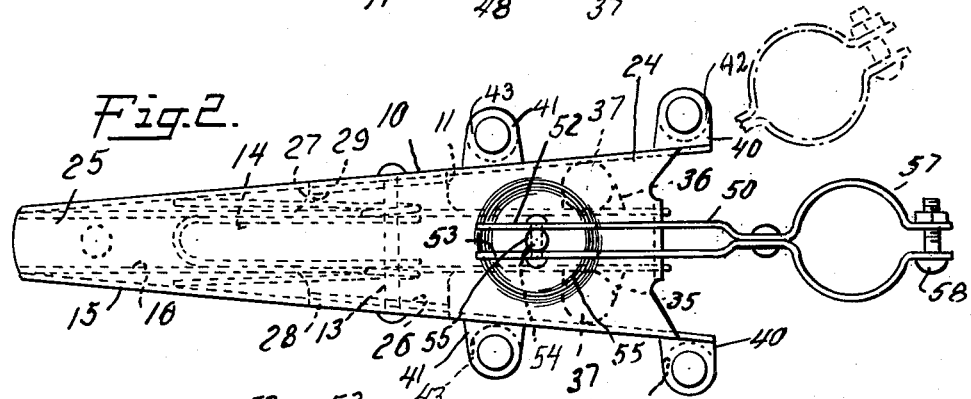
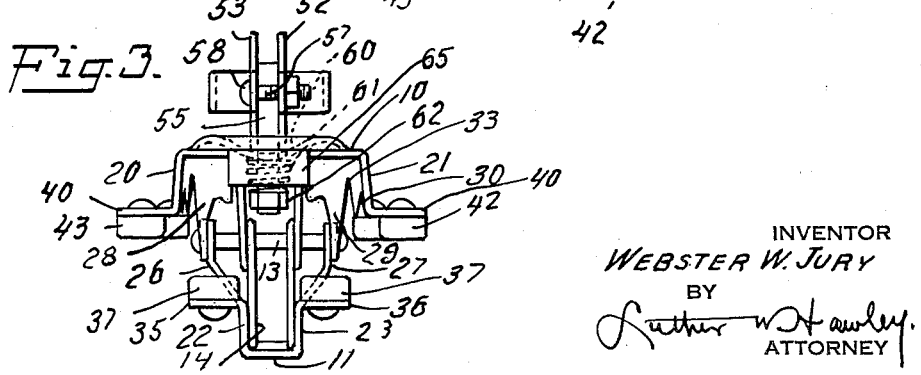
INVENTOR
WEBSTER W. JURY
BY
ATTORNEY Patented June 6, 1950

2,510,181

UNITED STATES PATENT OFFICE 2,510,181

CLAMP AND BRACKET ASSEMBLY

Webster W. Jury, Wayne Township,
Passaic County, N. J.

Application July 9, 1946, Serial No. 682,388

3 Claims. (Cl. 248—226)

This invention relates to a clamp and bracket assembly.

The clamp and bracket assembly constituting the invention is capable of wide use and may be used as a support for sun lamps, heat lamps, small electric fans, and in machine shops, photographic studios, garages, etc.

The invention has for its salient object to provide a structure of the character specified, so constructed and arranged that the clamp can be firmly and securely clamped to objects of various shapes and sizes.

Another object of the invention is to provide a clamp and bracket assembly so constructed and so connected that the bracket can be readily adjusted on the clamp in any direction and at any angle.

Further objects of the invention will appear from the following specification taken in connection with the drawings which form a part of this application, and in which Fig. 1 is an elevational view of a clamp and bracket assembly constructed in accordance with the invention, parts being shown in section;

Fig. 2 is a top plan view of the structure shown in Fig. 1; and

Fig. 3 is an end elevation of the structure, looking toward the left in Fig. 1.

In the particular form of the invention shown, the clamp comprises a pair of clamping members or jaws 10 and 11 which are pivoted together at 13 and are actuated in a direction to close the clamp by a spring 14 which encircles the pivot 13 and engages the arms 15 and 16 of the clamping members.

The clamping members or jaws 10 and 11 are channeled in transverse section, being provided with flanges 20 and 21 on the jaw 10 and flanges 22 and 23 on the jaw 11. The jaw 10, as shown particularly in Fig. 2, is tapered longitudinally, being wider at the clamping end 24 than at the opposite or handle end 25. The flanges 22 and 23 of the clamping member or jaw 11 are flared outwardly, as shown at 26 and 27, to fit within the pivot lugs 28 and 29 which extend inwardly from the flanges 20 and 21 of the clamping member or jaw 10.

A plurality of coacting parts on the two jaws are provided for engaging the support or object on which the clamp is to be mounted. As shown particularly in Fig. 1, the jaws 10 and 11 have formed therein inwardly opening, oppositely disposed notches 30 and 31, these notches being formed in the flanges 20 and 21 of the jaw 10 and in the flanges 22 and 23 of the jaw 11. These V-shaped notches are adapted to receive the edge portions of a bar shown in dot and dash lines at 32 in Fig. 1.

The flanges 20 and 21 of the clamping member or jaw 10 are also provided with alined, inwardly opening notches 33 which are adapted to receive a portion of the periphery of a round object or rod 34. Disposed opposite or below the notches 33, viewing Fig. 1, the jaw or clamping member 11 has formed thereon laterally extending lugs 35 and 36 on which are mounted buttons or cushions 37. These buttons or cushions are adapted to engage the opposite surface of the round rod or object 34 which is engaged by the notches 33.

The jaw member 10 also has formed thereon two sets of laterally extending, alined lugs 40, 40 and 41, 41. These lugs have mounted therein cushions or buttons 42 and 43. It will be noted that the lugs 35 and 36 and the cushions or buttons 37 carried thereby are disposed between the two sets of lugs 40, 40 and 41, 41, attention being directed particularly to Figs. 1 and 2. It will also be seen that the cushions or buttons 42 and 43 have their outer surfaces disposed in a single plane and are adapted to engage one surface 45 of a flat object shown in dot and dash lines in Fig. 1 and indicated at 46, whereas, the opposite surface 47 of the object 46 is engaged by the cushions or buttons 37.

From the foregoing description it will be seen that the clamps can be secured to the opposite surfaces of the table or flat object 46, to the outer edge portions of a bar 32, or on a round rod 34. Furthermore, the clamping member 11 has formed therein a threaded opening 48 and can thus be screwed onto a support, if desired.

The clamp above described has been designed particularly for use in conjunction with a clamp and bracket assembly and there is shown in the drawings a bracket comprising parallel bars 50 and 51 which are enlarged at their inner ends to form disks 52 and 53, which in turn are secured by a pin 54 to a swivel pin 55.

At the other end, the bars 50 and 51 are formed into a clamp 57 adapted to receive a lamp or any other desired object. A bolt 58 is provided to tighten the clamp 57 around the object secured therein.

The swivel pin 55 extends through a hole 59 formed in the upper jaw or clamping member 10, viewing Fig. 1, and the disks 52 and 53 formed on the inner ends of the bars 50 and 51 seat in a dished or arcuate bearing surface 60 which is formed on the outer surface of the clamping member or body 10.

A spring 61 encircles the lower end of the swivel pin 55 and engages a washer beneath the under surface of the portion 60 of the jaw 10 and is adjustably secured on the swivel pin 55 by a nut 62.

The jaw 10 has a lip 65 disposed centrally between the flanges 20 and 21 adapted to be engaged by the front ends 66 of the flanges 22 and 23 of jaw 11 when the clamp is inoperative. The clamp can then rest on a flat surface, on the cushions 42, 42 and jaw 11.

It will be evident from the foregoing description that the swivel pin 55 and the bracket carried thereby can be swung around the axis of the pin 55 through 360° and, furthermore, that the bracket can be swung on the pivot pin 54 through approximately 180°. Moreover, the spring 61 will securely hold the swivel pin 55 and the bracket in any position of adjustment.

Although one specified embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. A clamp comprising a pair of pivoted, channel shaped, clamping jaws, said jaws being flanged and having in the flanges of one of the jaws inwardly opening, alined V-shaped notches, the other jaw having transversely alined spaced clamping blocks disposed opposite said notches.

2. A clamp comprising a pair of flanged, pivoted, clamping jaws, channel shaped in section, one jaw being wider transversely than the other jaw and having on the channels thereof two sets of clamping surfaces, the sets being spaced longitudinally of the jaw, and the other jaw having on its channels one set of clamping surfaces respectively extending laterally of said channels and disposed between the two sets on the other jaw, the two sets on the first jaw being disposed in a single plane.

3. A clamp comprising a pair of flanged, pivoted, clamping jaws, channel shaped in section, one jaw being wider transversely than the other jaw and having two sets of clamping surfaces, the sets being spaced longitudinally of the jaw, and the other jaw having one set of clamping surfaces respectively extending laterally of said channels and disposed between the two sets on the other jaw, the two sets on the first jaw being disposed in a single plane, said jaws having inwardly opening, oppositely disposed, V-shaped notches adjacent their outer ends for receiving and engaging the edges of a bar or strip and securing the clamp thereto.

WEBSTER W. JURY.

REFERENCES CITED

The following references are of record in the file of this patent:

UNITED STATES PATENTS

| Number | Name | Date |
|---|---|---|
| 577,156 | Bragger | Feb. 16, 1897 |
| 625,032 | Homan | May 16, 1899 |
| 696,167 | Forester | Mar. 25, 1902 |
| 969,695 | Holsey | Sept. 6, 1910 |
| 1,070,292 | Robb | Aug. 12, 1913 |
| 1,684,347 | Dobbs | Sept. 11, 1928 |
| 1,690,491 | Knauff | Nov. 6, 1928 |
| 1,777,003 | Kollath | Sept. 30, 1930 |
| 1,834,682 | Colstad | Dec. 1, 1931 |
| 2,063,924 | Hanko | Dec. 15, 1936 |
| 2,454,613 | Peltier et al. | Nov. 23, 1948 |